United States Patent
Alarcon et al.

(10) Patent No.: US 10,384,675 B2
(45) Date of Patent: Aug. 20, 2019

(54) METHODS AND SYSTEMS FOR REMOTE PARKING ASSISTANCE

(71) Applicant: GM GLOBAL TECHNOLOGY OPERATIONS LLC, Detroit, MI (US)

(72) Inventors: Michael D. Alarcon, Markham (CA); Akram M. Abdel-Rahman, Ajax (CA); Grant L. Meade, Whitby (CA); Sigrid C. Wagner, Whitby (CA); Jeremy A. Salinger, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 15/294,859

(22) Filed: Oct. 17, 2016

(65) Prior Publication Data

US 2018/0105165 A1 Apr. 19, 2018

(51) Int. Cl.
| | |
|---|---|
| *B60W 30/06* | (2006.01) |
| *B60W 10/04* | (2006.01) |
| *B60W 10/10* | (2012.01) |
| *B60W 10/18* | (2012.01) |
| *B60W 10/20* | (2006.01) |
| *H04B 1/3822* | (2015.01) |

(Continued)

(52) U.S. Cl.
CPC ............ *B60W 30/06* (2013.01); *B60W 10/04* (2013.01); *B60W 10/10* (2013.01); *B60W 10/18* (2013.01); *B60W 10/20* (2013.01); *H04B 1/3822* (2013.01); *H04L 67/025* (2013.01); *H04L 67/12* (2013.01); *H04W 4/046* (2013.01); *B60W 2420/403* (2013.01); *B60W 2420/52* (2013.01); *B60W 2420/54* (2013.01); *B60W 2550/10* (2013.01); *B60W 2710/0605* (2013.01); *B60W 2710/10* (2013.01); *B60W 2710/18* (2013.01); *B60W 2710/20* (2013.01)

(58) Field of Classification Search
CPC ...... B60W 30/06; B60W 10/04; B60W 10/10; B60W 10/18; B60W 10/20; B60W 2420/403; B60W 2420/52; B60W 2420/54; B60W 2550/10; B60W 2710/0605; B60W 2710/10; B60W 2710/18; B60W 2710/20; H04B 1/3822; H04L 67/025; H04W 4/046
USPC ......................................................... 701/41
See application file for complete search history.

(56) References Cited

U.S. PATENT DOCUMENTS

| | | | | |
|---|---|---|---|---|
| 8,868,255 | B2 * | 10/2014 | Yoshioka | ................. B62D 1/00 340/435 |
| 9,573,592 | B2 * | 2/2017 | Prokhorov | ............ B60W 30/09 |
| 9,809,219 | B2 * | 11/2017 | Agnew | ................. B60W 30/09 |

(Continued)

*Primary Examiner* — Anne M Antonucci
*Assistant Examiner* — James E Stroud
(74) *Attorney, Agent, or Firm* — Quinn IP Law

(57) ABSTRACT

Methods and systems for automatically controlling a vehicle are disclosed. In one embodiment, a system includes an actuator configured to control one or more vehicle driving characteristics, at least one vehicle sensor configured to measure a vehicle characteristic, a remote assistant in communication with the vehicle, and a controller in communication with the actuator, the at least one vehicle sensor, and the remote assistant, the controller being programmed with an automated driving system control algorithm and configured to determine whether a failsafe condition has occurred based on sensor data from the at least one vehicle sensor, receive a control signal from the remote assistant, and automatically control the actuator based on the control signal.

17 Claims, 4 Drawing Sheets

(51) Int. Cl.
*H04L 29/08* (2006.01)
*H04W 4/04* (2009.01)

(56) References Cited

U.S. PATENT DOCUMENTS

| | | | |
|---|---|---|---|
| 9,952,054 B2* | 4/2018 | An | G01C 21/34 |
| 2014/0210646 A1* | 7/2014 | Subramanya | B61L 29/28 |
| | | | 340/928 |
| 2014/0218527 A1* | 8/2014 | Subramanya | G08G 1/143 |
| | | | 348/148 |
| 2015/0309512 A1* | 10/2015 | Cudak | G05D 1/0287 |
| | | | 701/23 |
| 2017/0008563 A1* | 1/2017 | Popken | G08G 1/168 |
| 2018/0039264 A1* | 2/2018 | Messner | G06K 9/00812 |

\* cited by examiner

METHODS AND SYSTEMS FOR REMOTE PARKING ASSISTANCE

INTRODUCTION

The present invention relates generally to the field of vehicles and, more specifically, to methods and systems for providing parking assistance to remotely park a vehicle after an operator steps away from an incomplete parking event.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

Remote parking systems allow an operator to park or unpark a vehicle while outside of the vehicle but still in proximity to the vehicle. The operator controls the park or unpark event through a Dead Man Switch (DMS) that may be located, for example, on the operator's phone or other handheld device. Once the operator releases the DMS, the respective parking maneuver pauses and continues once the DMS is re-pressed. However, if the connection between the handheld device and the vehicle is interrupted or terminated, the vehicle enters a failsafe mode and stops. After a predetermined number of timeout events, the vehicle ignition turns off and the vehicle remains where it was located when the operator last pressed the DMS or when the vehicle last had connection with the operator's wireless device.

However, if the operator leaves the vicinity of the vehicle prior to the completion of the park or unpark event, because the vehicle terminates the park or unpark event at the time when the communication between the vehicle and the operator is lost, the vehicle may be left in an unsafe or unsatisfactory location, such as extending out of a parking space into a lane of traffic or partially or fully blocking a neighboring vehicle.

Embodiments according to the present disclosure provide a number of advantages. For example, embodiments according to the present disclosure mitigate the unsatisfactory condition of an incomplete park or unpark event by utilizing a remote assistance system to complete the park or unpark event. Embodiments according to the present disclosure may reduce safety concerns that may result from incomplete park or unpark events. Additionally, embodiments according to the present disclosure may also provide increased customer satisfaction by remotely completing a vehicle parking maneuver.

In one aspect, a method of controlling a vehicle is disclosed. The method includes the steps of providing the vehicle with at least one vehicle sensor configured to detect at least one vehicle characteristic, a communication system, an actuator configured to control vehicle steering, throttle, braking, or shifting, and a controller in communication with the at least one vehicle sensor, the actuator, and the communication system, the controller having an automated driving system control algorithm; receiving, by the controller, sensor data corresponding to a physical environment of the vehicle from the at least one vehicle sensor; determining, by the controller, a projected parking path of the vehicle; detecting, by the controller, if the vehicle enters a failsafe mode; in response to the vehicle entering the failsafe mode, establishing a communication channel between the remote assistance center and the communication system of the vehicle; communicating, from the controller to the remote assistance center, the sensor data via the communication system; and automatically controlling, by the controller, the vehicle to follow the projected parking path.

In some aspects, the method further includes monitoring, by the remote assistance center, the sensor data obtained as the vehicle progresses along the projected parking path. In some aspects, the method further includes transmitting, by the remote assistance center, an operator contact signal if the vehicle enters the failsafe mode and determining, by the controller, if an operator response signal is received in response to the operator contact signal. In some aspects, the method includes transmitting, by the remote assistance center to the communication system, a control signal instructing the vehicle to follow the projected parking path.

In some aspects, step of determining the projected parking path includes identifying, by the controller, a desired parking location, detecting and tracking, by the controller, obstacles in the vicinity of the vehicle and the desired parking location, and generating, by the controller, a commanded vehicle path based on the presence and path of any detected obstacles.

In some aspects, failsafe mode indicates an incomplete parking event. In some aspects, the step of detecting if the vehicle enters the failsafe mode includes detecting a loss of communication between the communication system and a wireless device.

In another aspect, an automotive vehicle includes a vehicle steering system, a vehicle braking system, a vehicle throttle system, and a vehicle shifting system; at least one vehicle sensor; a communication system configured to communicate with a remote assistance center; at least one actuator configured to control the vehicle steering system, the vehicle braking system, the vehicle throttle system, and the vehicle shifting system; and a controller in communication with the at least one vehicle sensor, the at least one actuator, and the communication system, the controller programmed with an automated driving system control algorithm and configured to receive sensor data corresponding to a physical environment of the vehicle from the at least one vehicle sensor, determine a projected parking path of the vehicle, detect if the vehicle enters a failsafe mode, establish a communication channel between the remote assistance center and the communication system of the vehicle if the vehicle enters the failsafe mode, communicate the sensor data to the remote assistance center via the communication system, receive a control signal from the remote assistance center, and automatically control the at least one actuator according to the control signal.

In some aspects, the at least one vehicle sensor comprises at least one of the group including an optical camera, a RADAR sensor, a LIDAR sensor, a thermal camera, and an ultrasonic sensor. In some aspects, the controller is further configured to communicate, to the remote assistance center, sensor data obtained as the vehicle progresses along the projected parking path. In some aspects, determining the projected parking path includes identifying a desired parking location, detecting and tracking obstacles in the vicinity of the vehicle and the desired parking location, and generating a commanded vehicle path based on the presence and path of any detected obstacles.

In some aspects, the failsafe mode indicates an incomplete parking event. In some aspects, the step of detecting if the vehicle enters the failsafe mode includes detecting a loss of communication between the communication system and an operator-managed wireless device.

In yet another aspect, a system for autonomous control of a vehicle includes an actuator configured to control vehicle steering, braking, throttle, or shifting; at least one vehicle sensor configured to measure a vehicle characteristic; a communication system located in the vehicle; a remote assistant in communication with the vehicle via the communication system; and a controller in communication with the actuator, the at least one vehicle sensor, and the communication system, the controller being programmed with an automated driving system control algorithm and configured to determine whether a failsafe condition has occurred based on sensor data from the at least one vehicle sensor, receive a control signal from the remote assistant, and automatically control the actuator based on the control signal.

In some aspects, the failsafe condition corresponds to a detected obstacle in a predicted vehicle path. In some aspects, the failsafe condition corresponds to an incomplete parking event. In some aspects, the remote assistant is a live person. In some aspects, the controller is further configured to communicate the sensor data to the remote assistant if the failsafe condition has occurred. In some aspects, the at least one vehicle sensor comprises one or more of an optical camera, a LIDAR sensor, a RADAR sensor, a thermal camera, and an ultrasonic sensor. In some aspects, the control signal includes input and instructions provided by the remote assistant.

The above advantages and other advantages and features of the present disclosure will be apparent from the following detailed description of exemplary embodiments when taken in connection with the accompanying drawings.

BRIEF DESCRIPTION OF THE DRAWINGS

The present disclosure will be described in conjunction with the following figures, wherein like numerals denote like elements.

Figure 1:
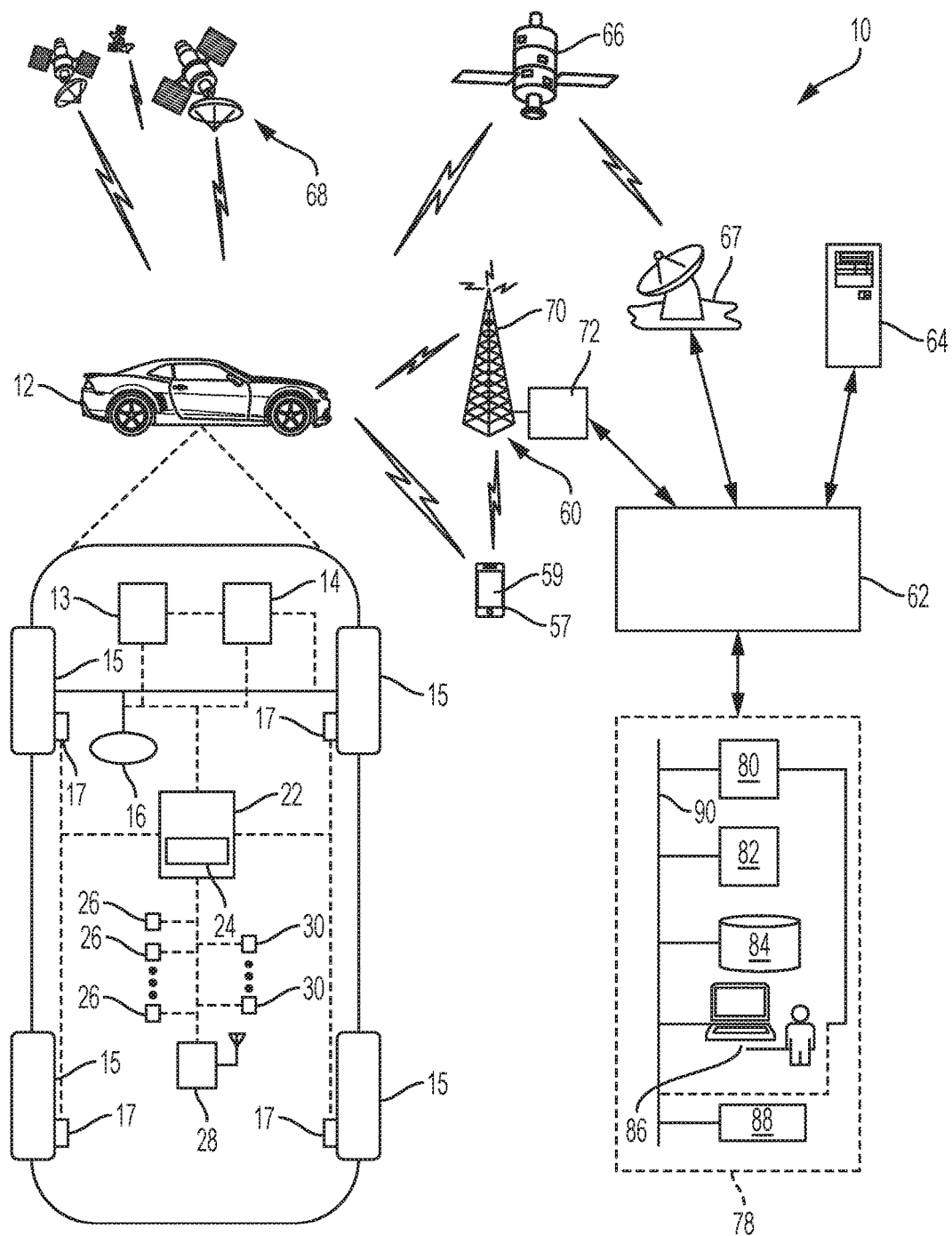
FIG. 1 is a schematic diagram of a communication system including an autonomously controlled vehicle, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent hut arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. The vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards, using Bluetooth, or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving assistance system (ADAS) 24 for automatically controlling various actuators in the vehicle. In an exemplary embodiment, the ADAS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communications system 28 of the vehicle 12 with a number of different system functions and, according to the exemplary embodiment shown in FIG. 1, generally includes one or more switches 80, servers 82, databases 84, live advisors 86, as well as an automated voice response system (VRS) 88. These various remote access center components are preferably coupled to one another via a wired or wireless local area network 90. The switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and the network 90. Data transmissions are passed via the modem to the server 82 and/or the database 84. The database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote access center 78 using the live advisor 86, it will be appreciated that the remote access center can instead utilize the VRS 88 as an automated advisor, or a combination of the VRS 88 and the live advisor 86 can be used.

Figure 2:
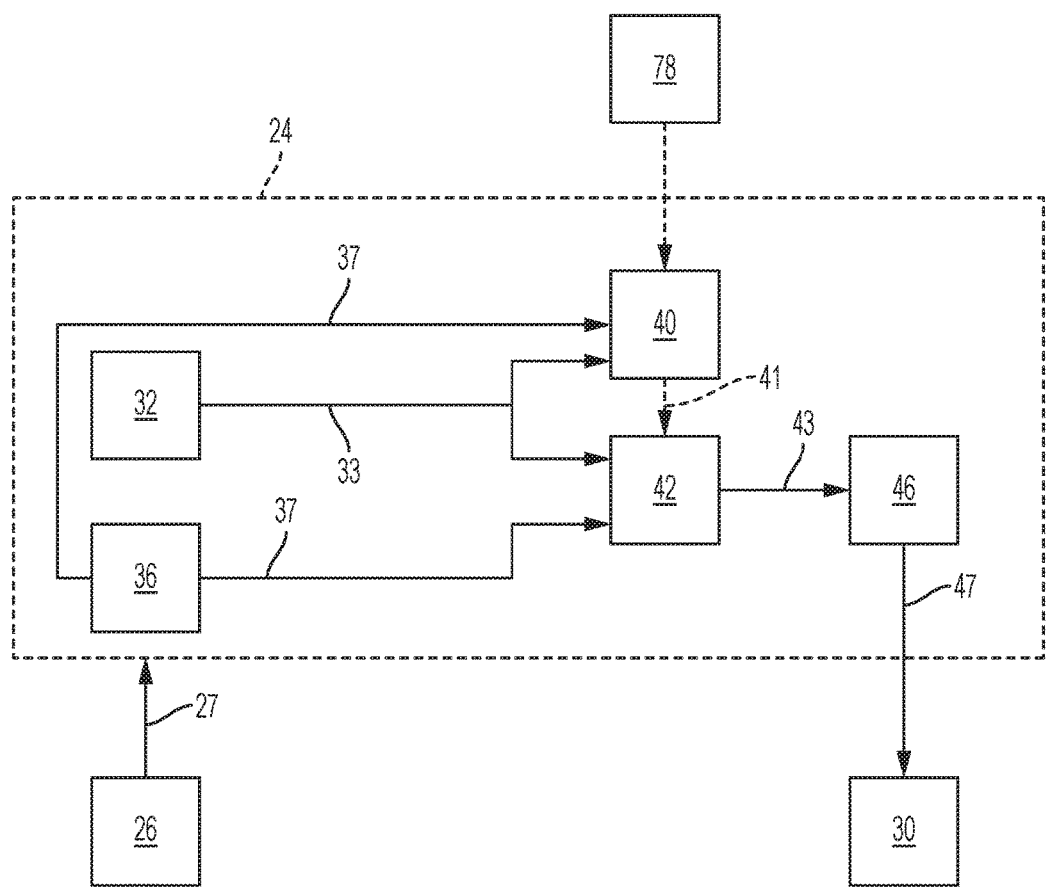
FIG. 2 is a schematic block diagram of an automated driving assistance system (ADAS) for a vehicle, according to an embodiment.

As shown in FIG. 2, the ADAS 24 includes multiple distinct control systems, including a sensor fusion and preprocessing module 32 that processes and synthesizes sensor data 27 from the variety of sensors 26. The sensor fusion and preprocessing module 32 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 32 outputs preprocessed sensor output 33. The sensor output 33 includes various calculated parameters including, but not limited to, a location of a detected obstacle relative to the vehicle, a predicted path of the detected obstacle relative to the vehicle, and a location and orientation of traffic lanes relative to the vehicle.

The ADAS 24 also includes a mapping and localization module 36 for determining the location of the vehicle and route for a current drive cycle. The mapping and localization module 36 is also configured to receive inputs from a variety of sensors, such as the sensors 26 illustrated in FIG. 1. The mapping and localization module 36 processes and synthesizes the inputs from the variety of sensors, and generates a mapping and localization output 37. The mapping and localization output 37 includes various calculated parameters including, but not limited to, a vehicle route for the current drive cycle, and a current vehicle location relative to the route.

The ADAS 24 also includes an observation and interpretation module 40. The observation and interpretation module 40 allows access to the vehicle by the remote access center 78. A live expert or advisor, e.g. the advisor 86 illustrated in FIG. 1, can optionally review the preprocessed sensor output 33 and the mapping and localization output 37. The live advisor 86 can provide additional input and/or override automatic driving operations and assume operation of the vehicle if desired or required by a vehicle situation, such as an incomplete parking event, as discussed in detail below. The observation and interpretation module 40 generates an interpreted output 41 that includes additional input provided by the live expert, if any.

The ADAS 24 additionally includes a path planning module 42 for determining a vehicle path to be followed to maintain the vehicle on the desired route while obeying traffic laws and avoiding any detected obstacles. The path planning module 42 employs a first obstacle avoidance algorithm configured to track and avoid any detected obstacles in the vicinity of the vehicle, a first lane keeping algorithm configured to maintain the vehicle in a current traffic lane, and a first route keeping algorithm configured to maintain the vehicle on the desired route. The path planning module 42 is configured to receive the sensor output 33, the mapping and localization output 37, and the interpreted output 41 (if any). The path planning module 42 processes and synthesizes the sensor output 33, the mapping and localization output 37, and the interpreted output 41 (if any) and generates a path planning output 43. The path planning output 43 includes a commanded vehicle path based on the vehicle route, vehicle location relative to the route, location and orientation of traffic lanes, and the presence and path of any detected obstacles.

The ADAS 24 further includes a vehicle control module 46 for issuing control commands to vehicle actuators 30. The vehicle control module 46 employs a first path algorithm for calculating a vehicle path. The vehicle control module 46 is configured to receive the path planning output 43. The vehicle control module 46 processes the path planning output 43 and generates a vehicle control output 47. The vehicle control output 47 includes a set of actuator commands to achieve the commanded path from the vehicle control module 46, including but not limited to a steering command, a shift command, a throttle command, and a brake command.

The vehicle control output 47 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

It should be understood that the disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
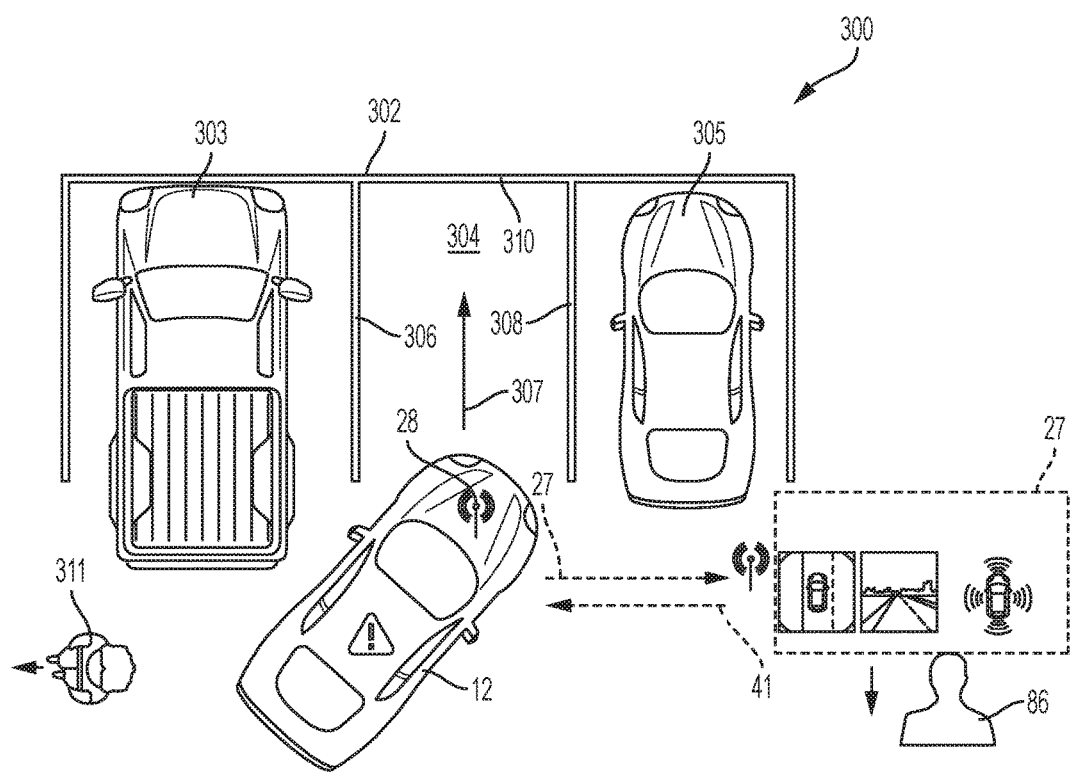
FIG. 3 is a schematic illustration of a remote self-park event, according to an embodiment.

FIG. 3 illustrates a scenario in which a remote assistant, such as the live advisor 86 shown in FIG. 1, may take control of the vehicle 12. Specifically, FIG. 3 illustrates an incomplete parking event in which a vehicle, such as the vehicle 12, has been unable to complete the parking event. Scenarios in which the vehicle 12 may not complete a parking event include, but are not limited to, loss of communication between the operator's wireless device, such as device 57, and the vehicle 12, a lack of timely response from the operator to queries from the vehicle 12 presented to the operator on the operator's wireless device 57 (e.g., an operator response signal is not received in response to an operator contact signal), abandonment of the vehicle 12 by the operator prior to successful completion of the parking event. The communication connection between the operator and the vehicle 12 is primarily via the operator's wireless device 57. If the wireless device 57 loses power or drops the communication connection with the vehicle 12, the ADAS 24 of the vehicle 12 will consider this a loss of communication. Additionally, if the operator is unreachable for any reason, that is, the operator does not respond to queries from the vehicle 12, the ADAS 24 will also consider this a loss of communication. For example, and without limitation, the operator may become unreachable due to illness, injury, lack of access to the wireless device 57, etc. In some scenarios, the operator may be unfamiliar with the remote parking feature of the vehicle and may not respond timely or appropriately to queries from the vehicle 12 and the ADAS 24 may treat this lack of response as a loss of communication with the operator.

In some embodiments, the remote parking feature of the vehicle 12 progresses without the operator in the vehicle 12. Once a parking spot is identified by the ADAS 24 of the vehicle 12, such as when the operator drives through a parking lot and indicates a desired parking style (parallel, drive through, back in, pull in, etc.), the operator is generally instructed to vacate the vehicle 12 prior to the vehicle 12 completing the parking event. In some embodiments, it is desirable to have the operator observe the vehicle 12 as it complete the parking or unparking event to make sure that the vehicle 12 does not encounter any unseen obstacles. Therefore, in some embodiments, the operator remains in proximity to the vehicle 12, as indicated by a wireless connection between the operator's wireless device 57 and the communication system 28 of the vehicle 12.

As discussed above, and illustrated in FIG. 3, remote parking systems allow an operator to park or unpark a vehicle while outside of the vehicle but still in proximity to the vehicle. The operator controls the park or unpark event by holding a Dead Man Switch (DMS) that may be located, for example, on the operator's phone or other handheld device. Once the operator releases the DMS, the vehicle 12 enters a series of timeout events. After a predetermined number of timeout events, the vehicle ignition turns off and the vehicle remains where it was located when the operator last pressed the DMS. However, if the operator leaves the vicinity of the vehicle prior to the completion of the park or unpark event, the vehicle may be left in an unsafe or unsatisfactory location, such as extending out of a parking space into a lane of traffic or partially or fully blocking a neighboring vehicle. In some scenarios, the operator may be unable to enter the vehicle to move it to a safe location, either due to space constraints that prevent the operator from opening the door. In these and other scenarios, a remote assistant, such as the live advisor 86, can provide oversight and instruction to direct the vehicle 12, via the ADAS 24, to a safe location by remotely parking or unparking the vehicle.

As shown in FIG. 3, an incomplete parking event 300 includes a vehicle 12 that has been instructed by the operator 311 to park remotely. The ADAS 24 of the vehicle 12 has located an available parking spot within the parking grid 302, specifically parking spot 304 and the operator 311 has instructed the vehicle 12 to park in the identified spot. Parking spot 304 is defined by parallel lines 306, 308 and line 310 which form a "U"-shape. The parking spot 304 is flanked on either side by parked vehicles 303, 305. While FIG. 3 illustrates a parking event in which the vehicle 12 has been instructed to park in a spot flanked by vehicles on either side, in other embodiments the vehicle 12 could be instructed to park in other locations, to back into a parking spot, or to parallel park, with or without vehicles in surrounding spaces.

As the operator 311 walks away from the vehicle 12, he or she maintains contact with the DMS via the wireless device 57. If the operator 311 knowingly or unknowingly leaves the vicinity of the vehicle 12 prior to completion of the park event, becomes unresponsive for any reason, or releases the DMS, the vehicle 12 may be left in an unsafe or unsatisfactory location, as shown in FIG. 3. Upon release of the DMS or loss of connection between the wireless communication system 28 of the vehicle 12 and the operator's device, such as the device 57, and after a first predetermined time elapses, the vehicle 12 enters a failsafe state and executes a first stage timeout. During the first stage timeout, the vehicle control module 46 commands the wheel brakes 17 to apply braking force and stop the vehicle. If the loss of connection between the wireless communication system 28 and the wireless device 57 continues, that is, after a second predetermined time elapses, the vehicle 12 will enter a second timeout stage and the vehicle control module 46 will command the vehicle transmission 14 to be placed into park. If the loss of connection between the wireless communication system 28 and the wireless device 57 continues still longer, that is, after a third predetermined time elapses, the vehicle 12 will enter a third timeout stage and the vehicle control module 46 will command the propulsion system 13 and the vehicle 12 to power off and fully abort the parking or unparking event. In some embodiments, this sequence of timeout events also occurs if the operator 311 prematurely releases the DMS and does not respond to queries to test whether the operator 311 is still within supervisory distance of the vehicle 12 as it completes the remote parking event. In some embodiments, this sequence of timeout events also occurs if the ADAS 24 of the vehicle 12 detects an obstacle and the obstacle does not move or is not moved by the operator 311 within the predetermined time periods.

In some embodiments, if the park or unpark event is unsuccessful, the ADAS 24 of the vehicle 12 instructs the vehicle 12 to follow guidance waypoints or "breadcrumbs" to move the vehicle 12 to the location where the operator 311 exited the vehicle. However, this may leave the vehicle 12 in an unsafe or unsatisfactory position and, in some scenarios, the operator 311 is not available to enter the vehicle 12 to either complete the parking or unparking event or more the vehicle to a safe location.

If the remote parking event is not completed successfully, such as, for example and without limitation, when the vehicle 12 progresses through one or more of the timeout stages discussed above, the operator 311 does not complete the supervision test by remaining within signal range of the wireless system of the vehicle 12, the operator 311 fails to timely respond to queries from the vehicle 12, or the battery of the wireless device 57 drains such that connection is lost between the vehicle 12 and the wireless device 57, the live advisor 86 can review sensor data of the vehicle 12 and the surrounding environment and instruct the vehicle 12 to safely complete the parking event.

With continued reference to FIG. 3, as the vehicle 12 enters the identified parking spot 304, the operator 311 exits the vehicle 12, walks away, and knowingly or unknowingly moves to an area where the wireless connection between the operator's wireless device 57 and the wireless communication system 28 of the vehicle is lost. When the wireless communication system 28 loses connection with the wireless device 57 of the operator 311, the ADAS 24 of the vehicle 12 proceeds through the timeout sequence as identified above. Initiation of one or more of the timeout stages discussed above triggers a signal to the remote access center 78 to request assistance to complete the parking/unparking event and place the vehicle 12 in a safe position. The assistance provided by the live advisor 86 or a computerized system includes sending an operator contact signal to the operator's wireless device to determine if the operator is able to continue oversight of the parking/unparking event, monitoring communications for receipt of an operator response signal in response to the operator contact signal, review of the sensor data of the vehicle 12, and instructions to complete the remote parking event while the live advisor 86 or computer provides oversight to monitor any undetected obstacles that may appear in the projected path of the vehicle 12. Sensor data 27 from the sensors 26, which may include, for example and without limitation, optical images, RADAR information, and LIDAR information, is transmitted to the observation and interpretation module 40 of the ADAS 24. Via a wireless connection established with the wireless communication system 28 of the vehicle 12, the live advisor 86 reviews the sensor data 27 and provides oversight and instruction to the vehicle 12 via interpreted output 41 that is wirelessly received by the vehicle 12 and transmitted to the path planning module 42 to determine a vehicle path to be followed to safely park the vehicle 12 while avoiding any obstacles that may be present if a response to the operator contact signal is not received. As discussed above, the path planning module 42 generates the path planning output 43 that includes a projected or commanded vehicle path into the identified parking spot 304 based on any detected obstacles. The path planning output 43 is received by the vehicle control module 46 that generates the vehicle control output 47 which includes a set of actuator commands to achieve the commanded path into the identified parking spot 304. The actuator commands include but are not limited to a steering command, a shift command, a throttle command, and a brake command.

Figure 4:
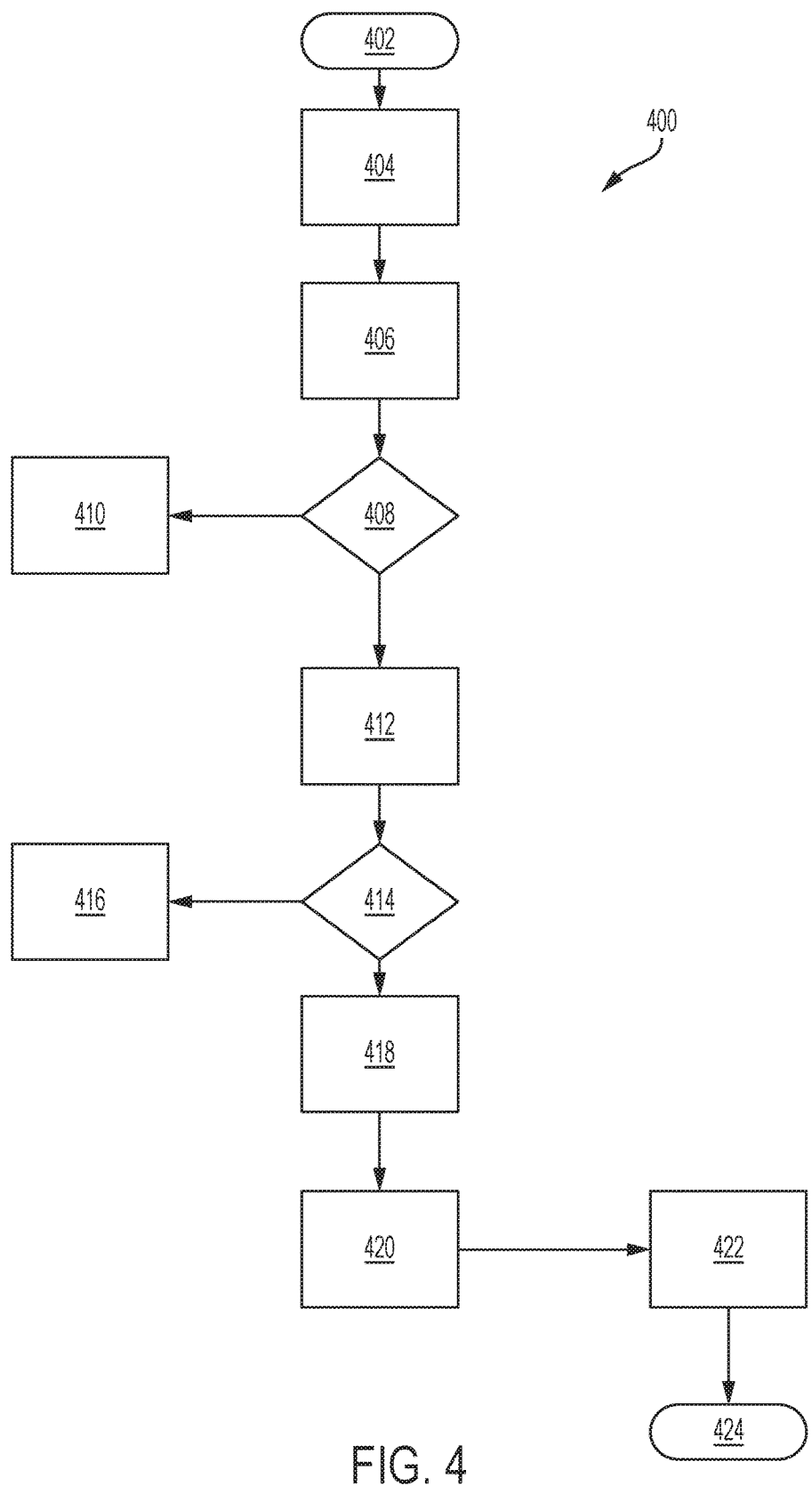
FIG. 4 is a flow chart of a method of providing remote assistance to complete a self-park or unpark event, according to an embodiment.

FIG. 4 is a flow chart of a method 400 illustrating the process by which remote assistance, such as a remote live advisor or a remote computer system, can assist and complete a remote parking/unparking event when the vehicle 12 is unable to complete the parking/unparking event. The method 400 can be utilized in connection with the mobile vehicle communication and control system 10, the vehicle 12, the controller 22, and the various modules of the ADAS 24, in accordance with exemplary embodiments. The order of operation of the method 400 is not limited to the sequential execution as illustrated in FIG. 4 but may be performed in one or more varying orders as applicable and in accordance with the present disclosure.

As shown in FIG. 4, starting at 402, the method 400 proceeds to step 404. At 404, the ADAS 24 of the vehicle 12 detects and locates an available parking spot. In some scenarios, for example and without limitation, the parking spot may be narrow or configured such that it would be difficult for the operator to exit the vehicle 12 after parking the vehicle or the parking spot may be located along a busy street such that it may be dangerous for the operator to exit the vehicle 12 after parking the vehicle. In these and other possible scenarios, the operator can choose to self-park the vehicle. Also at 404, the operator instructs the vehicle to self-park in the identified parking spot. The various modules of the ADAS 24 process the sensor data 27 provided by the sensors 26, including, for example and without limitation, optical images, RADAR, and LIDAR information, to generate a path for the vehicle 12 into the available parking spot. At 406, the operator exits the vehicle 12 and enables self-parking by the vehicle by, for example and without limitation, holding a DMS on a handheld wireless device, such as device 57. The operator remains within proximity to the vehicle, that is, within a distance to the vehicle 12 such that the vehicle 12 maintains communication with a handheld wireless device, such as device 57, held by the operator.

At 408, based on communication data received by the vehicle 12 from the device 57, or based on a lack of communication data received by the vehicle 12 from the device 57, the controller 22 makes a determination regarding whether the operator has maintained proximity to the vehicle 12 during the self-parking event. For example, in some embodiments, the operator remains within visible proximity to the vehicle 12 during the self-park event, as determined by the communication link between the device 57 and the vehicle 12, in order to oversee the self-park event and provide visual confirmation of successful completion of the event.

If the observation and interpretation module 40 of the controller 22 determines that the operator is within a predetermined proximity to the vehicle 12, based on, for example and without limitation, the operator maintaining contact with the DMS, the method 400 proceeds to 410. At 410, the vehicle 12 self-parks in the identified parking spot. Upon completion of the self-park event, the vehicle control module 46 commands the ignition of the propulsion system 13 to shut off.

If, at 408, the observation and interpretation module 40 of the ADAS 24 determines that the operator is not within the predetermined proximity to the vehicle 12 to oversee the self-park event or has released the DMS, or a communication signal between the wireless communication system 28 of the vehicle 12 and the wireless device 57 is dropped or interrupted, the method 400 proceeds to 412. At 412, the vehicle 12 progresses through one or more of the timeout stages discussed above, indicating a failed self-park event. The vehicle 12 first enters a failsafe state and enters a first timeout stage in which the vehicle control module 46 commands the wheel brakes 17 to apply braking force and stop the vehicle 12. If the loss of connection between the wireless communication system 28 and the wireless device 57 continues, or the operator does not acknowledge any messages generated by the observation and interpretation module 40 and transmitted to the operator's wireless device 57 via the wireless communication system 28, such as pressing the DMS, the vehicle control module 46 commands the vehicle transmission 14 to be placed into park. If further efforts to reach the operator, such as visual, auditory, or tactile messages issued from vehicle 12 or the wireless device 57, are unsuccessful, the vehicle control module 46 will command the propulsion system 13 and the vehicle 12 to power off.

At 414, a determination is made regarding whether the operator has been successfully contacted after the initiation of the timeout stages discussed above. In some embodiments, attempts to reach the operator 311 are made by the live advisor 86 of the remote access center 78 via, for example, the wireless device 57 or the communication system 28 of the vehicle 12. If the operator has been successfully contacted, as indicated, for example, by receipt of an operator response signal, the method 400 proceeds to 416. At 416, a connection has been re-established between the operator and the vehicle 12, including, for example, a wireless connection between the wireless device 57 and the wireless communication system 28 of the vehicle 12. Upon receipt of a confirmation of a successful connection, the ADAS 24 proceeds with the analysis and interpretation of the sensor data 27 and instruction of vehicle actuators 30 via the vehicle control module 46 to complete the self-park or unpark event.

If, at 414, the operator has not been successfully contacted after initiation of the timeout stages discussed above, the method 400 proceeds to 418. At 418, the live advisor 86 establishes a two-way connection with the vehicle 12 via the observation and interpretation module 40. The two-way communication between the vehicle 12 and the remote access center 78 includes the transmission of sensor data and the receipt of instruction for completion of the self-parking event. Image and sensor data is transmitted from the vehicle 12 via the wireless communication system 28 to the remote access center 78 for review by the live advisor 86. The remote access center 78 transmits commands, such as a control signal generated by the live advisor 86, to the ADAS 24 of the vehicle 12 via the wireless communication system 28. Next, at 420, the live advisor 86 reviews the preprocessed sensor output 33 and the mapping and localization output 37. The live advisor 86 reviews the preprocessed sensor output 33 that includes, for example and without limitation, 360 degree images of the environment surrounding the vehicle 12, overhead images of the vehicle 12, front, rear, and side camera images of the environment surrounding the vehicle 12, RADAR and LIDAR data, proximity and other detection data, among other preprocessed data, for any obstacles that may be present in the projected path of the vehicle 12 into the identified parking spot. The live advisor 86 also reviews the planned route for the vehicle 12 into the identified parking spot and the current vehicle location relative to the identified route, as included in the mapping and localization output 37. At 422, the observation and interpretation module 40 uses the preprocessed sensor output 33, the mapping and localization output 37, the control signal including input and instructions provided by the live advisor 86 to generate the interpreted output 41 that includes the instructions and oversight provided by the live advisor 86. The vehicle control module 46 provides instructions for the vehicle 12 as vehicle control output 47 to instruct the various actuator 30 of the vehicle 12 to control various vehicle systems in order to complete the self-parking event with oversight provided by the live advisor 86.

FIGS. 3 and 4 are discussed in the context of a self-park event. However, in other embodiments, the vehicle 12 could be instructed to complete a self-unpark event. Additionally, in some embodiments, the live advisor 86 provides guidance and instruction to remove the vehicle 12 from the failsafe mode and oversee the vehicle 12 as it maneuvers to a safe location for either further operation by the operator or for storage until the operator returns to the vehicle 12.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A method of controlling a vehicle, the method comprising:
providing the vehicle with at least one vehicle sensor configured to detect at least one vehicle characteristic, a communication system, an actuator configured to control vehicle steering, throttle, braking, or shifting, and a controller in communication with the at least one vehicle sensor, the actuator, and the communication system, the controller having an automated driving system control algorithm;

receiving, by the controller, sensor data corresponding to a physical environment of the vehicle from the at least one vehicle sensor;
determining, by the controller, a projected parking path of the vehicle;
establishing, by the controller, a connection between the communication system and a wireless device;
detecting, by the controller, if the vehicle enters a failsafe mode, the failsafe mode comprising a loss of communication between the communication system and the wireless device;
in response to the vehicle entering the failsafe mode, establishing a communication channel between a remote assistance center and the communication system of the vehicle, the remote assistance center separate from the wireless device;
transmitting, by the remote assistance center, an operator contact signal to the wireless device if the vehicle enters the failsafe mode;
determining, by the controller, if an operator response signal is received in response to the operator contact signal;
communicating, from the controller to the remote assistance center, the sensor data via the communication system;
if the operator response signal is not received by the controller in response to the operator contact signal, transmitting, by the remote assistance center to the communication system, a control signal instructing the vehicle to follow the projected parking path; and
automatically controlling, by the controller, the vehicle to follow the projected parking path.

2. The method of claim 1, further comprising monitoring, by the remote assistance center, the sensor data obtained as the vehicle progresses along the projected parking path.

3. The method of claim 1, further comprising transmitting, by the remote assistance center to the communication system, a control signal instructing the vehicle to follow the projected parking path.

4. The method of claim 1, wherein determining the projected parking path comprises identifying, by the controller, a desired parking location, detecting and tracking, by the controller, obstacles in the vicinity of the vehicle and the desired parking location, and generating, by the controller, a commanded vehicle path based on the presence and path of any detected obstacles.

5. The method of claim 1, wherein the failsafe mode indicates an incomplete parking event.

6. An automotive vehicle, comprising:
a vehicle steering system, a vehicle braking system, a vehicle throttle system, and a vehicle shifting system;
at least one vehicle sensor;
a vehicle communication system configured to communicate with a remote assistance center and an operator-managed wireless device, the remote assistance center separate from the operator-managed wireless device;
at least one actuator configured to control the vehicle steering system, the vehicle braking system, the vehicle throttle system, and the vehicle shifting system; and
a controller in communication with the at least one vehicle sensor, the at least one actuator, and the communication system, the controller programmed with an automated driving system control algorithm and configured to receive sensor data corresponding to a physical environment of the vehicle from the at least one vehicle sensor, determine a projected parking path of the vehicle, detect if the vehicle enters a failsafe mode, the failsafe mode comprising a loss of communication between the communication system and the operator-managed wireless device, establish a communication channel between the remote assistance center and the communication system of the vehicle if the vehicle enters the failsafe mode, communicate the sensor data to the remote assistance center via the communication system, if the vehicle enters the failsafe mode, receive a control signal from the remote assistance center, and automatically control the at least one actuator according to the control signal.

7. The automotive vehicle of claim 6, wherein the at least one vehicle sensor comprises at least one of the group including an optical camera, a RADAR sensor, a LIDAR sensor, a thermal camera, and an ultrasonic sensor.

8. The automotive vehicle of claim 6, wherein the controller is further configured to communicate, to the remote assistance center, sensor data obtained as the vehicle progresses along the projected parking path.

9. The automotive vehicle of claim 6, wherein determining the projected parking path comprises identifying a desired parking location, detecting and tracking obstacles in the vicinity of the vehicle and the desired parking location, and generating a commanded vehicle path based on the presence and path of any detected obstacles.

10. The automotive vehicle of claim 6, wherein the failsafe mode indicates an incomplete parking event.

11. A system for autonomous control of a vehicle, comprising:
an actuator configured to control vehicle steering, braking, throttle, or shifting;
at least one vehicle sensor configured to measure a vehicle characteristic;
a communication system located in the vehicle;
a remote assistant in communication with the vehicle via the communication system;
an operator-managed wireless device in communication with the vehicle via the communication system and in communication with the remote assistant; and
a controller in communication with the actuator, the at least one vehicle sensor, and the communication system, the controller being programmed with an automated driving system control algorithm and configured to determine whether a failsafe condition has occurred based on sensor data from the at least one vehicle sensor, determine if an operator response signal is received from the wireless device in response to an operator contact signal transmitted from the remote assistant, if the operator response signal is not received from the wireless device, receive a control signal from the remote assistant, and automatically control the actuator based on the control signal.

12. The system of claim 11, wherein the failsafe condition corresponds to a detected obstacle in a predicted vehicle path.

13. The system of claim 11, wherein the failsafe condition corresponds to an incomplete parking event.

14. The system of claim 11, wherein the remote assistant is a live person.

15. The system of claim 11, wherein the controller is further configured to communicate the sensor data to the remote assistant if the failsafe condition has occurred.

16. The system of claim 11, wherein the at least one vehicle sensor comprises one or more of an optical camera, a LIDAR sensor, a RADAR sensor, a thermal camera, and an ultrasonic sensor.

17. The system of claim 11, wherein the control signal includes input and instructions provided by the remote assistant.

\* \* \* \* \*